Patented Mar. 14, 1950

2,500,265

UNITED STATES PATENT OFFICE 2,500,265

POLYMERIZATION OF UNSATURATED ESTERS OF ACRYLIC AND METHACRYLIC ACIDS

Cheves T. Walling, Upper Montclair, N. J., and Robert H. Snyder, Chicago, Ill., assignors to United States Rubber Company, New York, N. Y., a corporation of New Jersey No Drawing. Application June 27, 1946, Serial No. 679,868

7 Claims. (Cl. 260—89.5)

This invention relates to the production of soluble, unsaturated resins derived from monomeric non-acidic polyunsaturated organic compounds containing the group $CH_2=C(R)-CO-$ (where R is hydrogen or alkyl) and one or more additional aliphatic double bonds which are unconjugated with respect to a doubly bonded carbon atom (i. e., the two or more double bonds are separated from each other by at least one intervening atom).

An object of the invention is to provide such soluble resins in high yield by direct polymerization of the said monomeric compound or the same in admixture with other polymerizable monomeric olefinic compounds. A further object is to provide such soluble resins in a substantially gel-free state. Another object is to provide soluble unsaturated resins obtained by the direct polymerization of certain 2-alkenyl propenoates or the same in admixture with one or more monomeric monoethylenic compounds containing one or more electro-negative substituents with practically the exclusive formation of a soluble polymeric product. Other objects will be apparent hereinafter.

Although the polymerizability of such as allyl acrylate, has been known for many years, the resinous products therefrom have undergone little commercial development. This may be attributed in part at least to the well-known fact (cf. U. S. Patents Nos. 2,181,739; 2,282,882; 2,273,891; 2,318,959) that the polymerization is characterized by the formation of an insoluble gel before much more than 5% of the monomer has been converted to the polymeric form. The resulting product, which usually consists of a heterogeneous mixture of insoluble gel, low molecular weight polymers and unreacted monomer, is not only difficult to manipulate in subsequent processing steps, but is virtually useless for many commercial applications such as laminating, coating, and impregnating operations wherein a soluble, fusible, homogeneous resin capable of subsequent conversion to a solvent and heat-resistant state is required or preferred.

Numerous attempts have been made by the art to overcome the above-mentioned disadvantages and secure a soluble, convertible polymerized 2-alkenyl propenoate of the kind herein disclosed. A method frequently proposed comprises interrupting the polymerization before gelation occurs: in practice, this process is difficult to control because of the exothermic nature of the polymerization as well as the rapidity with which it proceeds to the formation of insoluble, crosslinked products. Moreover, the yield of the resulting product is prohibitively small, seldom exceeding 5% of theory, and the polymer must be separated from the large amount of unreacted starting material while the latter in turn must be recovered and purified for use in subsequent polymerizations. The obvious inefficiency and expense of this method preclude its use on an industrial scale.

The prior art states that the yield of soluble polymer can be increased by conducting the polymerization in the presence of inert diluents. Although this method is advantageous because the polymerization reaction is more easily controlled, the prior art has noted that it is of but limited efficacy in delaying gelation, save in very dilute solutions, and even in the latter case, very substantial proportions of unreacted monomer can be recovered from the reaction mixture. Moreover, the use of large volumes of diluents further increases the operating costs and lowers the production capacity of the reaction vessel.

Various other devices have been suggested for increasing the yield of the soluble polymerized 2-alkenyl propenoate to a practicable level. The recommended use of high temperatures and/or large amounts of catalyst is undesirable, for under such vigorous conditions the normal rapidity of the polymerization is still further accelerated and premature insolubilization of the reaction mixture becomes even more difficult to avoid. The use of large amounts of catalyst also tends to contaminate the polymeric material with catalyst fragments and decomposition products. Similarly, the proposed use of polymerization inhibitors to avert gelation is objectionable since in practice a very careful and complete separation of the inhibitor from the polymer is necessary in order to avert discoloration of the latter as well as partial or complete inhibition of its subsequent conversion to an insoluble, infusible state.

It is apparent from the foregoing that the prior art has been unable to polymerize 2-alkenyl propenoates of the kind herein disclosed in such a manner as to obtain high yields of soluble, unsaturated polymers. Hence the commercial exploitation of such desirable products has been realized to a very limited extent and only then by the development of indirect synthetic methods such as the reaction of polyacrylic acid chloride with allyl alcohol (U. S. Patent No. 1,984,417), the esterification of polyallyl alcohol with acrylic acid (U. S. Patent No. 2,332,460), and the alcoholysis of a polyacrylic alkyl ester with allyl alcohol or a 2-substituted allyl alcohol (U. S. Patent No. 2,335,962). While these methods all give high yields of soluble, unsaturated polymers which can be further polymerized to a heat and solvent resistant state, they entail a number of additional operating steps. The initial saturated polymers must first be synthesized, isolated and purified, and then reacted to produce the desired unsaturated product which must likewise undergo isolation and purification prior to use.

Although this expensive and time-consuming procedure is considerably more elaborate than the direct polymerization mentioned previously, it appears to have constituted the only satisfactory method at present, for securing the soluble polymerized 2-alkenyl propenoates in commercially adequate yields.

According to our invention, we have found that the aforesaid objects may be attained, and the aforesaid prior art disadvantages obviated, by carrying out the polymerization of our monomeric chemicals in the presence of a catalyst selected from the class consisting of alkali metals, alkali metal alkyls, and alkali metal hydrides.

Accordingly, our invention relates to a method for obtaining high yields of soluble, unsaturated resins by the direct polymerization of non-acidic polyunsaturated organic compounds which contain the group $CH_2=C(R)-CO-$ where R is one of the class hydrogen and alkyl, e. g., methyl, and one or more additional unconjugated aliphatic double bonds. Our invention further relates to the production of soluble, unsaturated resins by copolymerization of such polyunsaturated compounds with polymerizable mono-olefinic compounds. Specifically, our invention comprises the use of a polymerization catalyst from the class consisting of alkali metals, alkali metal alkyls and alkali metal hydrides, whereby the polymerization of the polyunsaturated compounds defined above and the copolymerization thereof with polymerizable mono-olefinic compounds proceeds with the exclusive formation of soluble, polymeric products, i. e., substantially gel-free products.

"Polyunsaturated" refers to plural unsaturation and not to a polymeric state. Further, in the above and following description of our invention the term "non-acidic" designates compounds containing no functional groups capable of reacting with alkali metals with the evolution of hydrogen under the reaction conditions employed in our invention, said excluded functional groups being those which contain a reactive hydrogen atom attached to an atom other than carbon, such as oxygen, e. g., —OH, sulfur, e. g., —SH and nitrogen, e. g., —CO—NH—CO—.

Illustrative of the polyunsaturated compounds which are operable in our invention are those represented by the type formula $CH_2=C(R)-CO-X-$
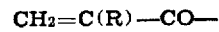
{R'—X' $_n$CH$_2$—C(R)=CH$_2$ where R is one of the radicals hydrogen and alkyl (e. g., methyl and ethyl); X is a hetero atom or group of hetero atoms (e. g., O, S, NH, N-alkyl, and N-2-alkenyl); X' is X or SO$_2$; R' is a bivalent organic radical such as an alkylene group of the general formula —C$_z$H$_{2z}$—, a cycloalkylene group —C$_z$H$_{2z-2}$—, an arylene group, or a similar group or substituted group containing a hetero atom or group of atoms, such as (—C$_z$H$_{2z}$)$_2$CO, or (—C$_z$H$_{2z}$)$_2$NH; where z is an integer and n is zero or an integer.

Examples of such compounds include allyl methacrylate, methallyl thioacrylate, N-allyl-acrylamide, N,N-diallyl acrylamide, N-methyl-N-allyl-acrylamide, methallyloxyethyl methacrylate, p-allyloxybenzyl acrylate, allyl thioacrylate, and methallylthiomethyl acrylate, allylsulfonyl ethyl methacrylate. It is understood that the above type formula represents but one of the many of the many classes of polyunsaturated compounds containing the group $CH_2=C(R)-CO-$ and one or more additional unconjugated aliphatic double bonds which can be polymerized to soluble, unsaturated resins by the method of our invention. Compounds such as N,N-dicrotyl acrylamide, vinyl acrylate and p-allylphenyl isopropenyl ketone are exemplary of other such classes which are likewise operable.

Among the copolymerizable mono-olefinic compounds which may be employed in our invention are the esters of non-enic (i. e., non-olefinic and non-acetylenic) monohydric alcohols and of acids from the class comprising propenoic acid and the 2-alkyl propenoic acids; e. g., methyl methacrylate, n-butyl acrylate. However, the polymerization of the polyunsaturated compounds previously defined may be carried out according to our invention in the presence of a wide variety of monoethylenic compounds containing one or more negative substituents, e. g., diethyl fumarate, vinyl acetate, vinyl methyl ketone, styrene, and acrylonitrile. Although many of the latter copolymerize with the polyunsaturated compounds to a lesser extent than do the above-mentioned propenoic acid derivatives, the resulting solutions of soluble, unsaturated polymers in the mono-ethylenic compounds can be subsequently cured to an insoluble, infusible state without the necessity for evaporation of a solvent since the monoethylenic compounds copolymerize with the unsaturated polymers, prepared by our method, during the final curing operation to yield cross-linked, insoluble products. Such solutions, which are capable of total polymerization to a solvent-resistant and heat-resistant state, are particularly valuable for casting and molding operations wherein minimum shrinkage and distortion during the curing process are of prime importance.

Particularly desirable embodiments of our invention are the soluble, unsaturated polymers of 2-propenyl propenoate, and its 2-alkyl substituted derivatives of the type formula $CH_2=C(R)-CH_2-O-CO-C(R)=CH_2$ where R is selected from the class consisting of hydrogen and alkyl, e. g., methyl and ethyl; as well as the soluble, unsaturated resins prepared by the copolymerization of such propenoates with the esters of nonenic monohydric alcohols and of acids of the class comprising propenoic acid and 2-alkyl propenoic acids, hereinafter designated as monoenic propenoic esters. Preferred are the parent compound allyl acrylate which yields polymers of the lowest molecular weight in our invention, and its three 2-methyl substituted derivatives, allyl methacrylate, methallyl methacrylate, and methallyl acrylate, although our method is generally applicable to all of the propenoates, embraced by the type formula given in this paragraph. Of the "monoenic" propenoic esters, the esters of acrylic acid and of methacrylic acid are best known and most readily available, while the alcohols from which these esters are derived may vary widely in type and include aliphatic alcohols such as methanol, ethanol, n-butanol, hexanol, and octanol; cycloaliphatic types, e. g., cyclohexanol; aromatic alcohols, e. g., phenol; and aralkyl types, e. g., benzyl alcohol. Considerable variation in the properties of the copolymers, such as hardness and flexibility, can be achieved by the choice of the suitable 2-alkenyl propenoate and monoenic propenoic ester as well as by the selection of appropriate proportions thereof, the former being variable from 1 to 100% of the polymerizable monomers in the reactant mixture.

Accordingly, the invention relates to the discovery that when the polymerization or copolymerization of the 2-alkenyl propenoate is conducted in the presence of a catalyst of the class consisting of alkali metals, their hydrides and alkyls, gelation of the reaction mixture is averted and a high yield of soluble, unsaturated, polymeric product results. In contrast to prior art methods, the polymerization according to our invention proceeds smoothly at moderate temperatures in conventional reaction vessels and does not require special reaction conditions or other precautions to avert insolubilization of the reaction mixture. Moreover, the resulting products are homogeneous in character, being uncontaminated with the insoluble gels frequently encountered in prior art polymerizations. As a result of our discovery, the use of these polymeric materials becomes both economically and commercially feasible in the plastics art, particularly for molding, coating, laminating, and impregnating operations wherein the polymers can be subsequently cured to a solvent and heat-resistant state which is characterized by exceptional clarity and resistance to discoloration.

Of the alkali metals, sodium and potassium are preferred. The activity of these catalysts is proportional to their surface area and hence it is desirable to employ them in a finely divided state. For the metals themselves, this is conveniently achieved by vigorous agitation of the molten metal under an inert high-boiling diluent such as xylene and sudden chilling of the resulting suspension, from which the finely divided metal "sand" settles out upon standing. Where extremely small quantities of catalyst are to be employed, it may be preferable to amalgamate the metal with a relatively large amount of mercury, and pulverize the resulting alloy. The metal hydrides can be readily pulverized to sufficiently fine powders, care being taken to exclude moisture and other reactive vapors from the atmosphere. The alkali metal alkyls, e. g., amyl sodium, can be readily prepared by the procedure of Morton (Jour. Am. Chem. Soc. 59 2387–90 (1937)).

Although the amount of the catalyst is to some extent dependent upon its state of sub-division, concentrations in the neighborhood of 1% or less, based on the weight of the non-acidic polyunsaturated monomer, are normally sufficient to effect the polymerization according to our method. The maximum amount of catalyst which can be employed in our invention is largely a matter of economics but is preferably not in substantial excess of 5% by weight of the polymerizable monomer or mixture of monomers.

We have found that commercial grades of the 2-alkenyl propenoates and of the monoenic propenoic esters often contain small amounts of peroxides which may in the ensuing polymerizations cause the formation of traces of polymeric gel. Although minor in amount (less than 1%), such gelled polymer tends to coat the catalyst particles and thus decrease their efficiency in promoting polymerization by our method. In such cases peroxides can be readily destroyed by traces (i. e., 10–50% by weight of the catalyst) of alkali, e. g., sodium alcoholates, in the polymerization reaction mixture, with the resultant production of completely gel-free products. It is preferred to have the polymerizable monomers substantially free of impurities which are reactive with the catalyst, particularly water and alcohols, since such materials tend to react preferentially with stoichiometric quantities of the catalyst and hence frequently necessitate the use of considerably larger amounts of the catalyst than prescribed above in order to effect a comparable polymerization.

The method of our invention is characterized by its simplicity and merely entails mixing of the polymerizable ester or esters with the catalyst, after which the course of the polymerization can be easily followed by observing the increase in the viscosity of the reaction mixture. The polymerization occurs readily at 0° C., and with increasing rapidity as the temperature is elevated, so that for practical purposes reaction temperatures above 100° C. are seldom if ever necessary. Reaction temperatures in the neighborhood of 25° C. have proven entirely satisfactory save where polymers of lower molecular weight are desired, in which case higher temperatures are employed. The molecular weights of the unsaturated resins prepared by our invention decrease appreciably with increasing reaction temperatures. The polymerization reaction is markedly exothermic even at 0° C., and one may, if desired, employ a diluent to dissipate the large amount of heat evolved and thus facilitate control of the reaction and of the quality of the product formed. The diluent likewise serves to maintain the viscosity of the reaction mixture at a reasonably low value so that adequate dispersion of the catalyst throughout the reaction mixture can be maintained, and subsequent mechanical handling of the reaction product (i. e., filtering, pumping, etc.) is facilitated. Any inert solvent that is unreactive with the catalyst and with the polymerizable esters employed in our invention can serve as a diluent. Exemplary of such inert solvents are the hydrocarbons, e. g., benzene, and ethers, e. g., diethyl ether and dioxane. Contrary to the prior art, the amount of diluent employed in our invention has little or no effect on the yield of soluble polymer formed. Hence the amount of the diluent may be varied widely in our method; amounts from 0 to 200% by weight of the polymerizable monomers usually prove adequate.

Upon completion of the polymerization, the reaction mixture may be filtered to remove the catalyst, and for this purpose can be treated with an excess of glacial acetic acid to precipitate any dissolved catalyst as the insoluble acetate. After removal of the latter by filtration, decantation, or centrifugation, the reaction mixture can be employed directly for various commercial operations such as impregnation, lamination, coating, etc. Alternatively, the polymeric product can be isolated by evaporation of the solvent and the products can then be further purified for analysis, or for specialized uses such as optical castings, by repeated solution in a solvent such as benzene and precipitation with a non-solvent such as n-hexane.

In the presence of heat and/or polymerization catalysts, compositions such as molding powders, enamels, and casting solutions which contain the polymers prepared by the method of our invention undergo further polymerization whereby insoluble heat-resistant products are formed. Suitable dyes, pigments, fillers, plasticizers, and resins may be incorporporated with the polymers prior to this final cure.

The follwing examples disclose our invention in more detail, all parts being by weight.

Example 1

Five-tenths of a part of potassium sand is added to a solution of 2.8 parts of allyl methacrylate in 10 parts of anhydrous c. p. benzene at 0° C. Within about 15 minutes the surface of the catalyst brightens appreciably and some of it dissolves with the concurrent development of a green color in the reaction mixture. After 1 hour, 4.7 parts of allyl methacrylate are added, and after 5 hours of reaction time 2.8 additional parts of allyl methacrylate are introduced into the reaction mixture. The latter is then maintained at 0° C., by cooling when necessary, for an additional 11 hours, at the end of which time a clear green viscous solution is obtained. The reaction mixture is diluted with 15 parts of benzene and filtered to remove the unreacted catalyst. To the filtrate are added 2 parts of glacial acetic acid which destroys the color and precipitates the dissolved potassium as potassium acetate. After filtration, the solution is evaporated at 0° C. and 5 mm. to a viscous syrup, and is then poured into a commercial grade of n-hexane, which preciptates the polymeric product. Further purification is effected by repeated solution in benzene and precipitation with hexane; after drying in vacuo to constant weight, 9.4 parts (91.5% of theory) of white polymeric solid are obtained which is readily soluble in benzene, acetone, chloroform and ethyl acetate.

*Analysis.*—Found: C, 66.47%; H, 8.04%; Iodine (Wijs) number 182.3. Calculated for polyallyl methacrylate: C, 66.64%; H, 7.99%; Iodine No. 201.

The analysis confirms the identity of the product as polyallyl methacrylate, and the iodine number indicates that the amount of unsaturation in the polymer corresponds to substantially one olefinic double bond for each monomer unit incorporated therein. This high degree of unsaturation enables the polymer to be readily polymerized to a solvent and heat-resistant state. It may be readily polymerized during subsequent curing operations by conventional polymerization catalysts such as the peroxides.

Example 2

A mixture of 0.3 part of sodium sand, 9.36 parts of allyl methacrylate and 8.5 parts of benzene is maintained at 0° C. for 72 hours with occasional shaking. The clear viscous solution is then filtered to remove the unreacted catalyst and treated with 1 part of glacial acetic acid which precipitates the dissolved sodium as sodium acetate. The precipitate is filtered off and the filtrate evaporated at 0° C. and 5 mm. to a white solid. This is purified by solution in diethyl ether, filtration of the solution and precipitation of the filtrate with n-hexane. The product is dried in vacuo to constant weight yielding 6.13 parts of polymeric solid. Upon concentration of the precipitating bath, i. e., the ether-hexane mixture, an additional amount of polymeric solid of somewhat lower molecular weight is obtained.

*Analysis.*—Found: C, 65.96%; H, 7.97%; Iodine No. 192. Calculated: C, 66.64%; H, 7.99%; Iodine No. 201.

The preceding examples have demonstrated the east with which the 2-alkenyl propenoate can be polymerized by our method at 0° C. However, on an industrial scale it may be preferable to carry out the reaction at room temperature as demonstrated below, and thereby eliminate the necessity for employing refrigerating equipment.

Example 3

To a vigorously agitated mixture of 2 parts of sodium sand in 170 parts of anhydrous benzene under an atmosphere of nitrogen are slowly added 93.6 parts of allyl methacrylate. The reaction is maintained at 25° C. by cooling when necessary. After 22 hours, the orange-colored reaction mixture is filtered, treated with 3 parts of glacial acetic acid, and the sodium acetate removed by filtration. The filtrate is diluted with an equal volume of benzene, and evaported at 0° C. and 5 mm. to yield 80.3 parts of white polymeric solid which is readily soluble in benzene, chloroform, acetone, diethyl ether, and ethyl acetate.

Intrinsic viscosity $[\eta]_0$ in benzene, 0.326. The viscosity corresponds to a polymer whose molecular weight is approximately 25,000.

The polymerization can likewise be carried out at elevated temperatures, if desired, the main effects being a decrease in both the reaction time and the molecular weight of the product, thus:

Example 4

Twenty-one parts of allyl methacrylate are added in the course of 0.75 hour to a refluxing mixture of 1 part of sodium sand and 42.5 parts of anhydrous benzene. Refluxing is continued at approximately 80° C. for an additional 3.25 hours. The reaction mixture is then filtered to remove unreacted catalyst, treated with 2.5 parts of glacial acetic acid, filtered to remove the sodium acetate thus formed, and evaporated at 0° C. and 5 mm. to a white polymeric solid. This is purified by repeated solution in diethyl ether, filtration, and subsequent precipitation with n-hexane. After drying to constant weight in vacuo 13.7 parts of polymeric product are obtained. Upon concentration of the precipitating bath (the ether-hexane mixture) an additional 3 parts of polymer are obtained.

*Analysis.*—$[\eta]_0$ in benzene, 0.06 (mol. wt. ca. 4,500).

Although hydrocarbon solvents such as the benzene employed above are a satisfactory class of diluents for our method of polymerization, other inert types are equally useful. Among the latter are inert solvents containing the ether linkage.

Example 5

Fifteen parts of allyl methacrylate are dissolved in 15 parts of anhydrous dioxane and admixed with 0.3 part of sodium sand. The reaction mixture is maintained by cooling at 25° C. for 18 hours after which it is thinned with 51 parts of benzene. The solution is treated with 2.0 parts of glacial acetic acid, thus precipitating the sodium as sodium acetate, and after filtration the solution is concentrated to a viscous syrup by evacuation at 0° C. and 5 mm. The residue is poured into n-hexane which precipitates the polymeric product. The latter is dissolved in a minimum volume of diethyl ether and reprecipitated with n-hexane at −10° C. The polymer is finally dissolved in benzene and evacuated at 0° C. and 5 mm. to a polymeric solid which is then dried in vacuo to constant weight at 25° C., yielding 12.9 parts of polymer.

*Analysis.*—Found: C, 66.39%; H, 7.93%; Iodine No. 191.4; $[\eta]_0$ in benzene, 0.083. Calculated: C, 66.64%; H, 7.99%; Iodine No. 201.

The analysis corresponds to that of pure polyallyl methacrylate. An additional amount of polymer can be recovered by concentrating the ether-hexane mixture from which the main body of the polymer has been precipitated.

The use of metallic sodium and potassium as polymerization catalysts in the above examples is illustrative of the alkali metals operable in our invention. Other forms of these catalysts may also be used, for example, the metal amalgams; thus:

Example 6 a. A mixture of 1 part of mercury and 4 parts of sodium are mixed and ground in a mortar. Two-tenths part of the solid amalgam are mixed with 4.68 parts of allyl methacrylate at room temperature. Within a few minutes the reaction becomes exothermic and the viscosity of the mixture increases to a marked extent.

b. A mixture of 8 parts of mercury and 0.1 part of sodium is melted and then cooled. After being ground in a mortar, the amalgam is added to a solution of 10 parts of allyl methacrylate in 10 parts of anhydrous benzene at 25° C. After 1 hour, the reaction mixture develops a greenish-yellow color. At the end of 80 hours, the clear green viscous reaction mixture is decanted from the amalgam, treated with 1 part of glacial acetic acid, and filtered to remove the sodium acetate formed. The filtrate is evacuated at 0° C. and 5 mm. to a viscous gum which is purified by repeated solution in diethyl ether and precipitation with n-hexane. The product is finally dissolved in 3 volumes of benzene and evacuated at 0° C. and 5 mm. to yield 9 parts of white polymeric solid which is soluble in benzene, diethyl ether, acetone, chloroform, and ethyl acetate.

*Analysis.*—Found: Iodine No. 197.5; $[\eta]_0$ in benzene. 0.277. Calculated: Iodine No. 201.

The hydrides of the alkali metals are likewise operative in the method of our invention; thus:

Example 7

Six-tenths part of powdered sodium hydride is mixed with a solution of 10 parts of allyl methacrylate in 10 parts of anhydrous benzene at −50° C. in a pressure vessel under a nitrogen atmosphere. The mixture is warmed up to 25° C. and then agitated for 72 hours. The viscous liquid reaction mixture is filtered to remove unreacted catalyst, and the filtrate is treated with 2 parts of glacial acetic acid to precipitate the dissolved sodium. After removal of the latter by filtration, the solution is evacuated at 0° C. and 5 mm. to a white polymeric solid which is readily soluble in chloroform, acetone, and benzene.

*Analysis.*—Found: Iodine No. 195; $[\eta]_0$ in benzene, 0.638 (mol. wt. ca. 48,000). Calculated: Iodine No. 201.

The preceding examples have all disclosed only the polymerization of allyl methacrylate, but the method of our invention is likewise applicable to the polymerization of other propenoates as illustrated below.

Example 8

A mixture of 9.4 parts of methallyl methacrylate, 8.5 parts of benzene and 0.3 parts of sodium sand is maintained at 0° C. for 96 hours with occasional agitation. Upon isolation and purification of the reaction product as in previous examples, 7.44 parts of resilient white solid are obtained which is readily soluble in benzene, acetone, chloroform, and ethyl acetate.

*Analysis.*—Found: C, 67.63%; H, 8.59%; Iodine No. 166.2. Calculated for polymethallyl methacrylate: C, 68.54%; H, 8.63%; Iodine No. 181.0.

The analysis indicates the product to be substantially pure polymethallyl methacrylate and the iodine number indicates that the polymer contains substantially one olefinic double bond for every monomer unit incorporated therein.

Example 9 a. Ten parts of allyl acrylate are dissolved in 10 parts of anhydrous benzene and the solution is mixed with 0.6 part of finely divided sodium hydride in an atmosphere of nitrogen. The reaction mixture is placed in a pressure vessel and maintained at 25° C. for 48 hours with continuous agitation. The viscous green reaction mixture is thinned with an equal volume of benzene and filtered to remove the unreacted catalyst. One and three-tenths parts of glacial acetic acid are then added to the filtrate and the precipitated sodium acetate is removed by filtration. The solution is then evacuated at 0° C. and 5 mm. to a plastic mass which is purified by solution in a minimum volume of diethyl ether and precipitation with ice-cold n-hexane. The precipitated product is redissolved in benzene and evacuated at 0° C. and 5 mm. to constant weight, yielding 7.3 parts of a soft, gum-like polymer.

b. Five-tenths part of sodium sand and 1 part of a saturated solution of sodium amylate in n-amyl alcohol (to destroy peroxides) are added to 15 parts of allyl acrylate at −50° C. The mixture is then warmed to 25° C., at which temperature it is maintained for 20 hours (with occasional cooling when necessary). The reaction mixture is then diluted with an equal volume of benzene, and treated with 1.5 parts of glacial acetic acid to remove the dissolved sodium as sodium acetate. After filtration, the solution is poured into n-hexane which precipitates the polymeric product. The solution is refluxed for several minutes to extract any low molecular weight polymers which are present and the solution is then decanted from the polymer. The latter is redissolved in benzene, precipitated with n-hexane, and dried in vacuo to yield a colorless, gum-like polymer.

*Analysis.*—Found: C, 64.14%; H, 7.16%; Iodine No. 198.4. Calculated: C, 64.27%; H, 7.19%; Iodine No. 226.0.

The analysis corresponds to that of pure polyallyl acrylate and the iodine number indicates that the polymer contains substantially one olefinic double bond for every monomer unit incorporated therein.

Evaporation of the benzene and n-hexane extract yields an additional amount of polymeric gum from which no monomeric allyl acrylate can be recovered by heating at 100° C. and 3 mm. This product is low molecular weight polymer.

The copolymerization of the 2-alkenyl propenoates with propenoic acid esters of non-enic monohydric alcohols by the method of our invention likewise leads to the formation of soluble,

Example 10

A mixture of 3.0 parts of allyl methacrylate, 12 parts of n-butyl methacrylate, 15.0 parts of anhydrous benzene and 0.5 part of sodium sand is agitated at 25° C. for 2 hours and then maintained at —5° C. for an additional 17 hours. The viscous reaction mixture is filtered to remove the unreacted catalyst, and subsequently treated with 1.5 parts of glacial acetic acid to remove the dissolved sodium as sodium acetate. After filtration, the solution is poured into n-hexane at —20° C. and the precipitated copolymer is dried in vacuo to yield a flexible, somewhat rubbery solid.

*Analysis.*—Found: C, 66.39%; H, 8.7%; Iodine No. 115.

The analysis corresponds to a copolymer containing approximately 57.1% by weight of allyl methacrylate and 42.9% of n-butyl methacrylate.

Example 11

Twenty parts of allyl methacrylate and 80 parts of n-butyl methacrylate are dissolved in 100 parts of anhydrous benzene and mixed with 1.0 part of sodium sand. After 5 hours at 25° C., the viscous reaction mixture is diluted with an additional 100 parts of benzene and reaction is allowed to continue for an additional 13 hours. The reaction mixture is then filtered to remove the unreacted catalyst, and is treated with 3.0 parts of glacial acetic acid to precipitate the dissolved sodium as sodium acetate. After filtration, the solution is evacuated at 0° C. and 5 mm. to yield 97.5 parts of polymeric solid.

*Analysis.*—Found: C, 67.22%; H, 9.46%; Iodine No. 43.6; $[\eta]_0$ in benzene, 0.262.

The analysis indicates a copolymer containing approximately 21.5% by weight of allyl methacrylate and 78.5% of n-butyl methacrylate.

Example 12

Five-tenths part of sodium sand is added to a solution of 70 parts of methyl acrylate and 30 parts of allyl acrylate in 150 parts of benzene, under an atmosphere of nitrogen. After 2 hours at 25° C., the solution develops a yellow color and most of the sodium has dissolved. Five-tenths part of sodium is then added to the mixture and reaction is continued at 25° C. for an additional 19 hours. At the end of this time, the sodium has completely dissolved and the reaction is halted. Five parts of glacial acetic acid are added to the reaction mixture to precipitate the dissolved sodium as sodium acetate. After filtration, the clear yellow solution is evacuated at 0° C. and 5 mm. to a constant weight of 90 parts of a gumlike polymer.

*Analysis.*—Found: C, 59.45%; H, 6.99%; Iodine No. 69.1.

The analysis corresponds to a copolymer containing approximately 30.5 by weight of allyl acrylate and 69.5% of methyl acrylate.

Example 13

A mixture of 7.5 parts of allyl acrylate, 7.5 parts of n-butyl methacrylate, 15 parts of benzene, and 0.7 parts of finely divided sodium hydride, is maintained at 25° C. in a pressure vessel for 90 hours. At the end of this time, the catalyst has dissolved completely and the viscous reaction mixture has assumed an amber color. The reaction mixture is diluted with 15 parts of benzene and treated with 1.5 parts of glacial acetic acid. After filtration to remove the sodium acetate formed, the colorless solution is evacuated at 0° C. and 5 mm. to a gummy polymer. This is dissolved in a minimum quantity of diethyl ether and precipitated with n-hexane at —10° C. The polymer is dried in vacuo to a constant weight of 6.1 parts of an extremely viscous, polymeric liquid.

*Analysis.*—Found: C, 65.39%; H, 8.04%; Iodine No. 126.9.

The analysis corresponds to a copolymer containing approximately 56.1% allyl acrylate and 43.9% butyl methacrylate.

The soluble, unsaturated resins obtained by the method of our invention are readily converted to an insoluble, infusible form by further polymerization with little or no discoloration or diminution in clarity. Thus the polymers may be cast and molded in various shapes, or they can be dissolved in solvents and employed for coating and impregnating purposes. Application of heat to compositions containing these polymers, particularly in the presence of peroxidic catalysts, converts them to a solvent and heat-resistant state.

Example 14 a. Three parts of polymeric allyl methacrylate from Example 3 are dissolved in 7 parts of benzene and the solution is flowed onto a glass panel. After baking at 200° C. for 30 minutes, a clear, hard, colorless film is obtained which is completely insoluble in benzene and acetone.

b. Three parts of the interpolymer of allyl methacrylate and n-butyl methacrylate prepared in Example 11 are dissolved in 7 parts of benzene. The solution is flowed onto a glass panel and baked at 200° C. for 30 minutes to yield a clear, hard, flexible film which is insoluble in acetone and benzene. When the film is heated for an additional 30 minutes, the hardness increases but no discoloration occurs.

Alternatively, the polymers prepared by our method can be insolubilized by copolymerization with various reactive ethylenic compounds such as diethyl fumarate, diallyl fumarate, and methyl acrylate. The polymers dissolve readily in a number of these ethylenic compounds to form solutions of only moderate viscosity even at high solids content. These solutions can be totally polymerized with or without the addition of catalysts, leaving no solvent to be evaporated, and hence they are particularly useful in casting and molding operations wherein a minimum of shrinkage and "blowing" are of prime importance.

Example 15

Polymerization of allyl methacrylate is carried out as in Example 3, and 112 parts of the reaction mixture are treated with glacial acetic acid and filtered to remove sodium acetate, and then mixed with 2 parts of diethyl fumarate and 13 parts of n-butyl methacrylate. The mixture is then evacuated at 25° C. and 5 mm. to remove the benzene, leaving 39 parts of clear, viscous residue. To this solution is added 0.6 part of benzoyl peroxide and the mixture is heated in a cylindrical mold for 46 hours at 60° C. The resulting casting is hard, clear, and insoluble in acetone and benzene. Moreover, it is neither swelled nor softened after 24 hours' immersion in these solvents.

Example 16

A copolymer of allyl methacrylate and n-butyl methacrylate is prepared as in Example 11, and after the usual treatment with glacial acetic acid, 120 parts of the reaction mixture are mixed with 19 parts of n-butyl methacrylate and 0.6 part of benzoyl peroxide, and evacuated at 25° C. and 5 mm. to remove benzene, leaving 54 parts of clear, viscous solution. The latter is poured into a plate mold and cured at 60° C. for 15 hours and then at 90° C. for 1 hour to yield a clear, tough sheet of marked flexibility which is insoluble in acetone and benzene.

*Example 17*

The advantages of our invention over the prior art can be clearly demonstrated by comparative polymerizations in the presence of a catalyst of the type used in our method and the types heretofore employed by the art, as follows:

The polymerizations are summarized below in Table I. The polymeric products from the sodium-catalyzed polymerizations are freed from catalyst by the usual treatment with acetic acid and are then purified in the same manner as the other polymers of Table I, i. e., by repeated solution in benzene, precipitation with n-hexane and drying in vacuo to constant weight.

*Table I*

|   | Allyl Methacrylate | Catalyst | Parts | Moles | Reaction Temp. | Reaction Time | Soluble Polymeric Product |
|---|---|---|---|---|---|---|---|
|   |   |   |   |   | °C. | Hours |   |
| a | 5.0 | Sodium "sand" | 0.05 | 0.0022 | 23 | 24 | [1] 1.70. |
| b | 5.0 | ...do... | 0.05 | 0.0022 | 23 | 22 | 4.00. |
| c | 5.0 | Aluminum Chloride | 0.30 | 0.0023 | 23 | 24 | No polymer. |
| d | 5.0 | Stannic Chloride | 0.67 | 0.0026 | 23 | 24 | Do. |
| e | 5.0 | Titanium Tetrachloride | 0.52 | 0.0027 | 23 | 24 | Do. |
| f | 5.0 | Benzoyl Peroxide | 0.50 | 0.0021 | 22 | 22 | [4] 0.15. |
| g | 5.0 | ...do [2]... | 0.05 | 0.00021 | 23 | 192 | [4] 0.23. |
| h | 5.0 | ...do [3]... | 0.05 | 0.00021 | 60 | 2.5 | [4] 0.92. |
| i | 5.0 | ...do [3]... | 0.50 | 0.0021 | 60 | 1.5 | [4] 1.83. |

[1] Polymerization slowed by high viscosity of reaction mixture.
[2] Ten parts of anhydrous C. P. benzene added to reactant mixture.
[3] Twenty parts of anhydrous C. P. benzene added to reactant mixture.
[4] Polymerization halted at point of incipient gelation.

Comparison of I—a with I—f demonstrates the marked beneficial effect which the catalyst employed in our invention exerts upon the yield of the soluble polymers over that obtained with prior art catalysts. Comparison of Examples I—i and I—b shows that even under the optimum conditions recommended by the prior art, i. e., elevated reaction temperature and dilute solution, the yield of soluble polymer thus obtained is markedly less than that secured by our method even at room temperature and in the presence of only small amounts of diluent. Examples I—c, d, and e show the "acidic" type catalysts suggested by the art to be completely ineffective as polymerization catalysts for the 2-alkenyl propenoates.

*Example 18*

The method of our invention can be further distinguished from prior art procedures by its indifference to the action of hydroquinone which is a well-known inhibitor of peroxide-catalyzed polymerizations of ethylenic compounds.

To a mixture of 0.3 part of sodium sand, 4.25 parts of benzene and 0.05 part of hydroquinone, maintained at 25° C., 10 parts of allyl acrylate are slowly added in the course of 1 hour. The polymerizing reaction mixture is maintained at 25° C. with cooling for 19 hours after which it is poured into 66 parts of n-hexane containing 1.0 part of glacial acetic acid. The precipitated polymer is redissolved in chloroform and filtered to remove the insoluble sodium acetate. The polymer solution is then poured into n-hexane and the precipitated product is dried in vacuo to a white plastic solid which is readily soluble in acetone, chloroform, benzene and ethyl acetate. It will be noted that the amount of hydroquinone used is sufficient to completely prevent peroxide catalyzed polymerization under the reaction conditions used herein.

From the foregoing examples, it is readily apparent that our novel method for preparing the soluble 2-alkenyl propenoate polymers and copolymers is not only far superior to those of the prior art in respect to the yield of soluble product obtained, but actually differs in a fundamental manner from such prior art processes in that the polymerization, according to our invention, proceeds by a mechanism markedly dissimilar to those known heretofore for the polymerization of such propenoates.

While we have shown and described various embodiments of the invention, it is to be understood that the invention is susceptible to those modifications which appear within the spirit of the invention and the scope of the appended claims.

Having thus described our invention, what we claim and desire to protect by Letters Patent is:

1. A polymerizable mix comprising a monomeric non-acidic polyunsaturated organic compound containing the group $CH_2=C(R)-CO-$ and at least one additional unconjugated aliphatic double bond R being from the class consisting of hydrogen and alkyl and a catalytic amount of a catalyst of polymerization selected from the class consisting of alkali metal, alkali metal alkyls, and alkali metal hydrides the alkali-metal being selected from the class consisting of sodium and potassium.

2. A polymerizable mix comprising a monomeric compound of the formula $$CH_2=C(R)-CH_2-O-CO-C(R)=CH_2$$

R being from the class consisting of hydrogen and alkyl, and a catalytic amount of a catalyst selected from the class consisting of alkali metals, alkali metal alkyls, and alkali metal hydrides the alkali-metal being selected from the class consisting of sodium and potassium.

3. A polymerizable mix comprising a monomeric compound as defined in claim 2, containing in addition a copolymerizable monomeric monoethylenic compound containing an electronegative substituent, and a catalytic amount of a catalyst of polymerization selected from the class consisting of alkali metals, alkali metal alkyls, and alkali metal hydrides the alkali-metal being selected from the class consisting of sodium and potassium.

4. A process of forming a soluble unsaturated polymerization product from a polymerizable mix comprising a monomeric compound as defined in claim 2 which comprises carrying out the polymerization in the presence of a catalytic amount of a catalyst of polymerization selected from the class consisting of alkali metals, alkali metal alkyls, and alkali metal hydrides, for a time and at a temperature to form a substantially gel-free product the alkali-metal being selected from the class consisting of sodium and potassium.

5. A polymerizable mix comprising a monomeric compound as defined in claim 2, and an alkyl ester of acrylic acid, and a catalytic amount of a catalyst of polymerization selected from the class consisting of alkali metals, alkali metal alkyls, and alkali metal hydrides, the alkali-metal being selected from the class consisting of sodium and potassium.

6. A polymerizable mix comprising a monomeric compound as defined in claim 2, and an alkyl ester of methacrylic acid, and a catalytic amount of a catalyst of polymerization selected from the class consisting of alkali metals, alkali metal alkyls, and alkali metal hydrides, the alkali-metal being selected from the class consisting of sodium and potassium.

7. A method which comprises first forming a soluble polymerizate of a monomeric compound as defined in claim 2, by promoting the polymerization with a catalytic amount of a catalyst selected from the class consisting of alkali metals, alkali metal alkyls, and alkali metal hydrides, the alkali-metal being selected from the class consisting of sodium and potassium and afterward, in the presence of a different catalyst, promoting the polymerization of the said soluble polymerizate with a copolymerizable monomeric monoethylenic compound containing an electro-negative substituent and which is an ester of a nonenic monohydric alcohol and a propenoic acid.

CHEVES T. WALLING.
ROBERT H. SNYDER.

REFERENCES CITED

The following references are of record in the file of this patent:

UNITED STATES PATENTS

| Number | Name | Date |
|---|---|---|
| 2,005,414 | Dykstra | June 18, 1935 |
| 2,155,856 | Britton et al. | Apr. 25, 1939 |
| 2,273,891 | Pollack et al. | Feb. 2, 1942 |

FOREIGN PATENTS

| Number | Country | Date |
|---|---|---|
| 314,116 | Canada | Aug. 11, 1931 |
| 843,845 | France | July 11, 1939 |